(12) United States Patent  
Yamasaki

(10) Patent No.: US 9,278,643 B2  
(45) Date of Patent: Mar. 8, 2016

(54) VEHICLE HEADLIGHT LIGHT DISTRIBUTION PATTERN

(71) Applicant: Fuji Jukogyo Kabushiki Kaisha, Tokyo (JP)

(72) Inventor: Kentarou Yamasaki, Tokyo (JP)

(73) Assignee: FUJI JUKOGYO KABUSHIKI KAISHA, Shinjuku-Ku, Tokyo (JP)

( * ) Notice: Subject to any disclaimer, the term of this patent is extended or adjusted under 35 U.S.C. 154(b) by 0 days.

(21) Appl. No.: 14/314,265

(22) Filed: Jun. 25, 2014

(65) Prior Publication Data

US 2015/0003085 A1    Jan. 1, 2015

(30) Foreign Application Priority Data

Jun. 26, 2013   (JP) ................................ 2013-133684

(51) Int. Cl.
| | |
|---|---|
| *F21V 21/00* | (2006.01) |
| *B60Q 1/068* | (2006.01) |
| *B60Q 1/076* | (2006.01) |
| *B60Q 1/14* | (2006.01) |
| *F21S 8/10* | (2006.01) |

(52) U.S. Cl.
CPC ............... *B60Q 1/068* (2013.01); *B60Q 1/076* (2013.01); *B60Q 1/143* (2013.01); *F21S 48/1159* (2013.01); *F21S 48/1258* (2013.01); *F21S 48/1323* (2013.01); *F21S 48/1747* (2013.01); *F21S 48/328* (2013.01); *B60Q 2300/21* (2013.01); *B60Q 2300/41* (2013.01); *B60Q 2300/42* (2013.01)

(58) Field of Classification Search
CPC ............. F21S 48/1388; F21S 48/137–48/145; F21S 48/1311; F21S 48/1159
USPC .................................. 362/465–468, 507–538
See application file for complete search history.

(56) References Cited

U.S. PATENT DOCUMENTS

| | | | |
|---|---|---|---|
| 7,387,417 B2* | 6/2008 | Sazuka et al. ................. | 362/544 |
| 7,866,862 B2* | 1/2011 | Nakata et al. ................. | 362/507 |
| 2001/0019483 A1 | 9/2001 | Takada | |
| 2005/0094411 A1* | 5/2005 | Ishida et al. .................. | 362/538 |
| 2008/0130302 A1* | 6/2008 | Watanabe ...................... | 362/466 |
| 2010/0033984 A1* | 2/2010 | Sugimoto ...................... | 362/538 |
| 2010/0309679 A1* | 12/2010 | Yamagata et al. ............ | 362/539 |

FOREIGN PATENT DOCUMENTS

| | | |
|---|---|---|
| JP | 2001-195910 | 7/2001 |
| JP | 2011-003515 | 1/2011 |
| JP | 2011-161035 | 8/2011 |

* cited by examiner

*Primary Examiner* — Tracie Y Green  
(74) *Attorney, Agent, or Firm* — Troutman Sanders LLP

(57) ABSTRACT

A vehicle headlight includes: a first illuminator including a projector unit that has a projection optical system and illuminates a predetermined region ahead of a vehicle with a first light distribution pattern having a cutoff line at an upper end; and a second illuminator that has a reflector unit including a reflective optical system for illumination with a second light distribution pattern that includes a region on an oncoming lane side of an elbow point of the cutoff line of the first light distribution pattern and that substantially does not include a region on a non-oncoming lane side of the elbow point.

5 Claims, 7 Drawing Sheets

VEHICLE HEADLIGHT LIGHT DISTRIBUTION PATTERN

CROSS-REFERENCE TO RELATED APPLICATIONS

The present application claims priority from Japanese Patent Application No. 2013-133684 filed on Jun. 26, 2013, the entire contents of which are hereby incorporated by reference.

BACKGROUND

1. Technical Field

The present invention relates to a vehicle headlight provided to a vehicle such as an automobile, and particularly relates to a vehicle headlight that reduces the contrast above and below a cutoff line and prevents a driver of a vehicle from feeling a sense of incongruity and to a vehicle headlight that reduces the contrast above and below a cutoff line and prevents a driver of other vehicles from being dazzled.

2. Related Art

A headlight of a vehicle such as an automobile projects light emitted from a light source such as, for instance, an incandescent light bulb, discharge lamp, and LED with a projection optical system such as a projector and a reflective optical system such as a reflector.

With such a headlight, switching is possible between a driving beam (high beam) for use during normal driving and a passing beam (low beam) for use when passing an oncoming vehicle.

In order to prevent glare that dazzles an oncoming driver, a cutoff line is formed in a predetermined range at the upper edge of a light distribution pattern for the passing beam, such that light is substantially not radiated above the cutoff line.

In such a headlight, it is known that a desired light distribution pattern is formed through collaborative use of a plurality of light sources or optical systems.

For instance, Japanese Unexamined Patent Application Publication (JP-A) No. 2011-3515 describes that a main light distribution pattern or the like having a cutoff line is formed by a projector unit and a diffused light distribution pattern is formed by a reflector unit.

JP-A No. 2011-161035 describes that a part of a beam emitted by a light source of a projector unit is guided to a reflector by a mirror member to illuminate a shoulder or the like on the driving lane side.

JP-A No. 2001-195910 describes a technique in which an auxiliary light distribution pattern for a passing beam from a projector unit is formed by an auxiliary reflector.

In a technique disclosed in JP-A No. 2001-195910, a cutoff line formed by a projector unit is illuminated, with an auxiliary light distribution pattern formed by a reflector unit, on both the left and right sides (oncoming side and non-oncoming side) of an elbow point arranged in the middle.

A projector unit using a projection optical system is advantageous in space efficiency since the configuration is relatively compact. However, since a clear cutoff line is formed due to the structure, a driver may feel a sense of incongruity in the contrast above and below the cutoff line.

By illuminating the vicinity of the cutoff line of the projector unit with a reflector unit that uses a reflective optical system capable of a relatively moderate change in luminance around a light distribution pattern to reduce the contrast above and below the cutoff line, it is possible to reduce the sense of incongruity in a driver.

However, in the case where the cutoff line on the left and right sides of the elbow point is illuminated with the reflector unit as with the technique disclosed in JP-A No. 2001-195910, light is distributed additionally to a region that is already illuminated uniformly with a main light distribution pattern on the non-oncoming lane side (vehicle side) of the elbow point, and a resulting non-uniformity of the light distribution pattern on a road surface may cause a driver to feel a sense of incongruity.

In the case where the vicinity of the cutoff line is illuminated by the reflector unit, light is radiated above the cutoff line to some degree. Therefore, a driver of an oncoming vehicle or a preceding vehicle may be dazzled by the glare.

SUMMARY OF THE INVENTION

The present invention has been designed in consideration of the circumstances described above, and an object thereof is to provide a vehicle headlight that reduces the contrast above and below a cutoff line and prevents a driver of a vehicle from feeling a sense of incongruity.

Another object of the present invention is to provide a vehicle headlight that reduces the contrast above and below a cutoff line and prevents a driver of other vehicles from being dazzled.

A first aspect of the present invention provides a vehicle headlight including: a first illuminator including a projector unit that has a projection optical system and illuminates a predetermined region ahead of a vehicle with a first light distribution pattern having a cutoff line at an upper end; and a second illuminator including a reflector unit that has a reflective optical system for illumination with a second light distribution pattern that overlaps with the cutoff line in a region on an oncoming lane side of an elbow point of the cutoff line of the first light distribution pattern and that substantially does not include a region on a non-oncoming lane side of the elbow point.

The vehicle headlight may further include an other-vehicle detector that detects another vehicle driving ahead of the vehicle and an illumination controller that stops the illumination by the second illuminator in a case where the another vehicle has been detected.

Another aspect of the present invention provides a vehicle headlight including: a first illuminator including a projector unit that has a projection optical system and illuminates a predetermined region ahead of a vehicle with a first light distribution pattern having a cutoff line at an upper end; a second illuminator that has a reflector unit including a reflective optical system for illumination with a second light distribution pattern including the cutoff line of the first light distribution pattern;, an other-vehicle detector that detects another vehicle driving ahead of the vehicle; and an illumination controller that stops the illumination by the second illuminator in a case where the another vehicle has been detected.

The other vehicle detector may include an imaging unit that captures an image ahead of the vehicle to detect a high-luminance portion corresponding to a headlight or taillight of another vehicle from an image captured by the imaging unit.

DETAILED DESCRIPTION

The present invention achieves the object of providing a vehicle headlight that reduces the contrast above and below a cutoff line and prevents a driver of a vehicle from feeling a sense of incongruity by illuminating a cutoff line formed by a projector unit only on the non-oncoming lane side of an elbow point with a reflector unit having a light distribution pattern that overlaps with the cutoff line.

Also, the present invention achieves the object of providing a vehicle headlight that reduces the contrast above and below a cutoff line and prevents a driver of other vehicles from being dazzled by providing a reflector unit having a light distribution pattern that overlaps with a cutoff line of a projector unit and turning off the reflector unit in response to detection of an oncoming vehicle or a preceding vehicle.

An example of a vehicle headlight to which the present invention is applied will be described below.

The vehicle headlight (hereinafter referred to simply as "headlight") in the example is provided to the front end of a body of an vehicle such as a passenger car.

Figure 1:
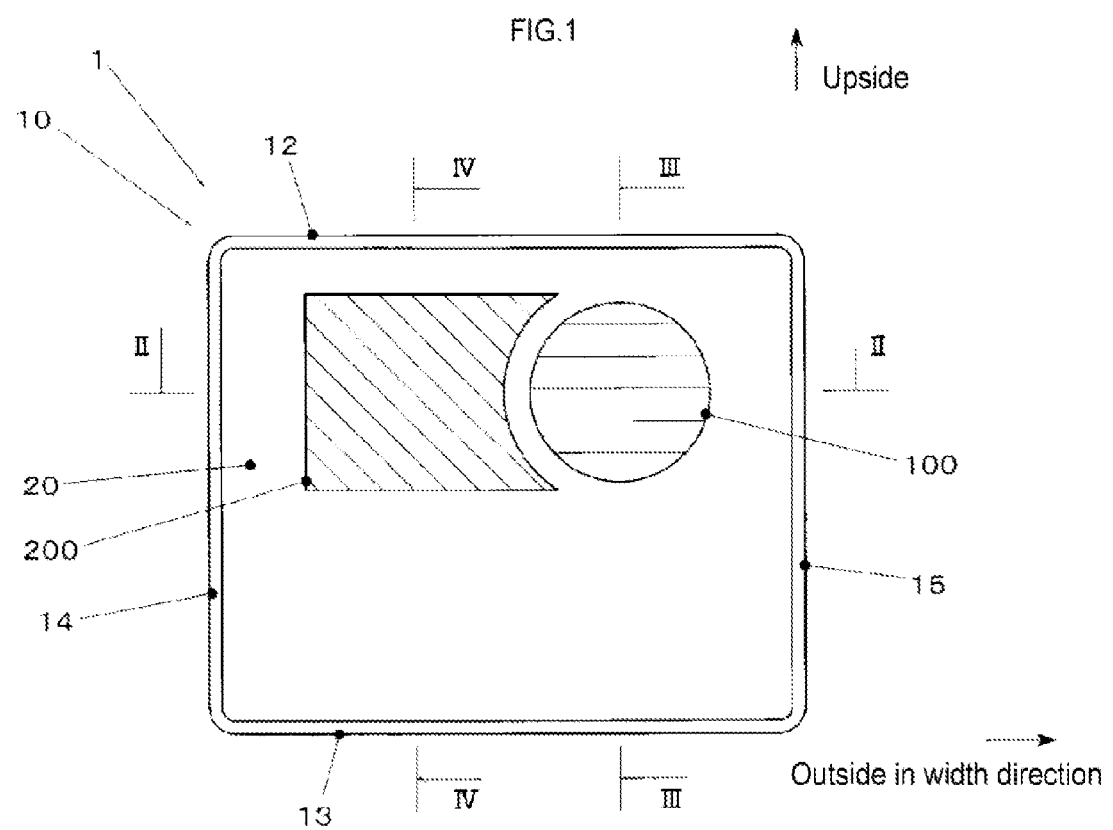
FIG. 1 is a view of a vehicle headlight according to an example of the present invention when seen from the front.

FIG. 1 is a view of the headlight in the example when seen from the front.

Figure 2:
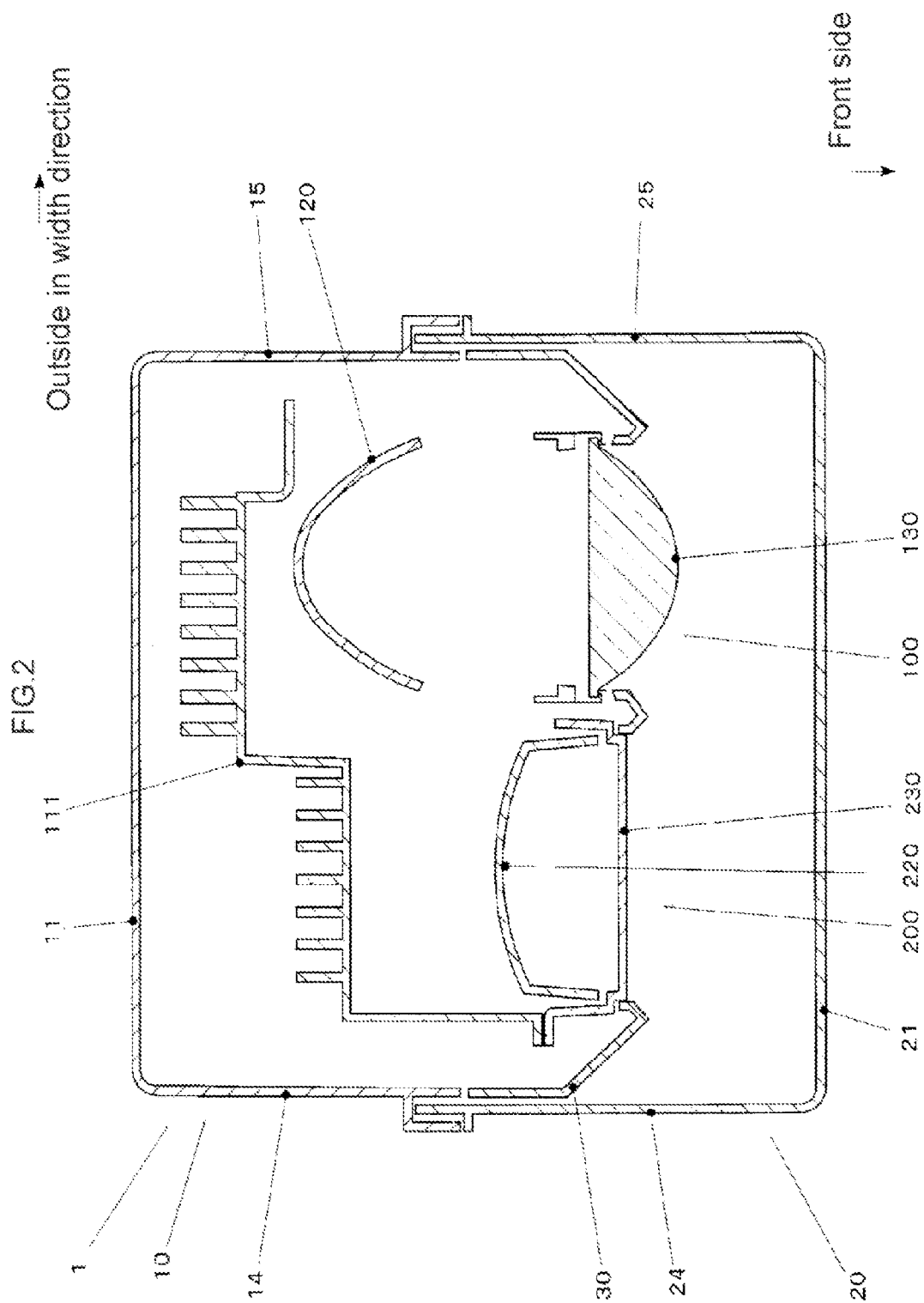
FIG. 2 is a sectional view along line II-II in FIG. 1.

FIG. 2 is a sectional view along line II-II in FIG. 1.

Figure 3:
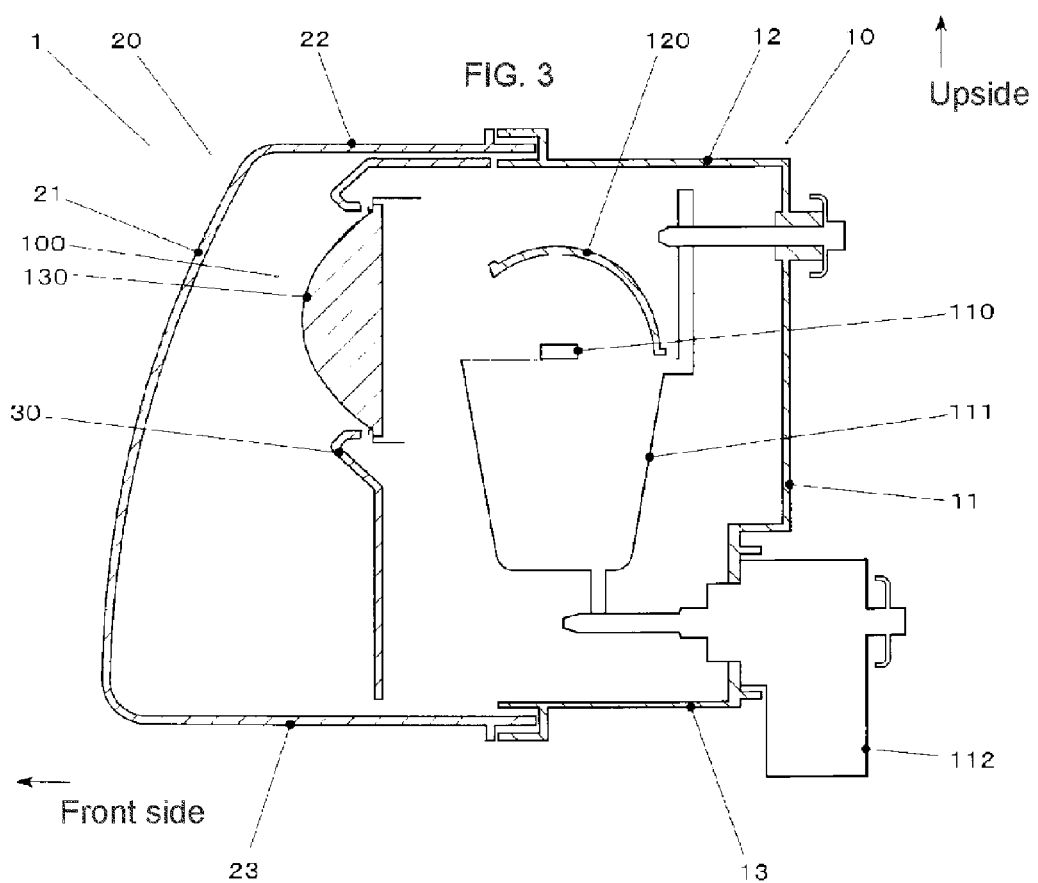
FIG. 3 is a sectional view along line III-III in FIG. 1.

FIG. 3 is a sectional view along line III-III in FIG. 1.

Figure 4:
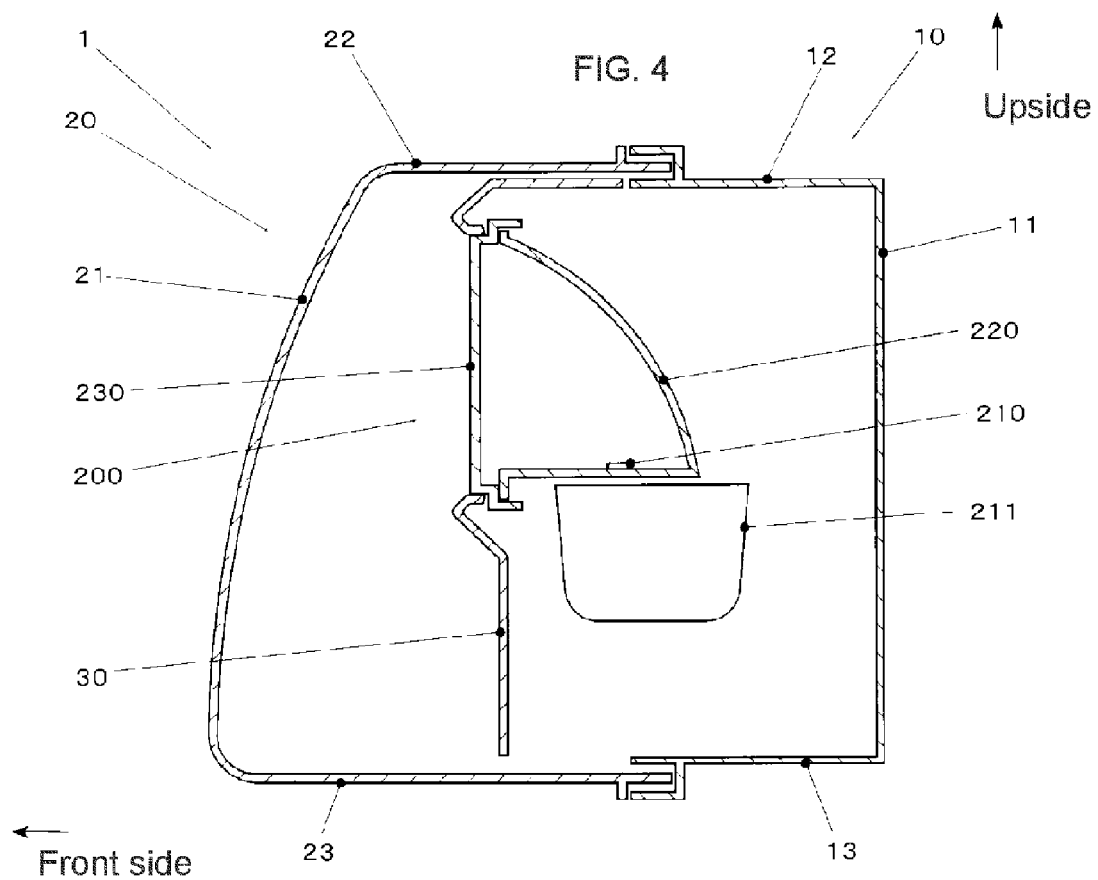
FIG. 4 is a sectional view along line IV-IV in FIG. 1.

FIG. 4 is a sectional view along line IV-IV in FIG. 1.

Figure 5:
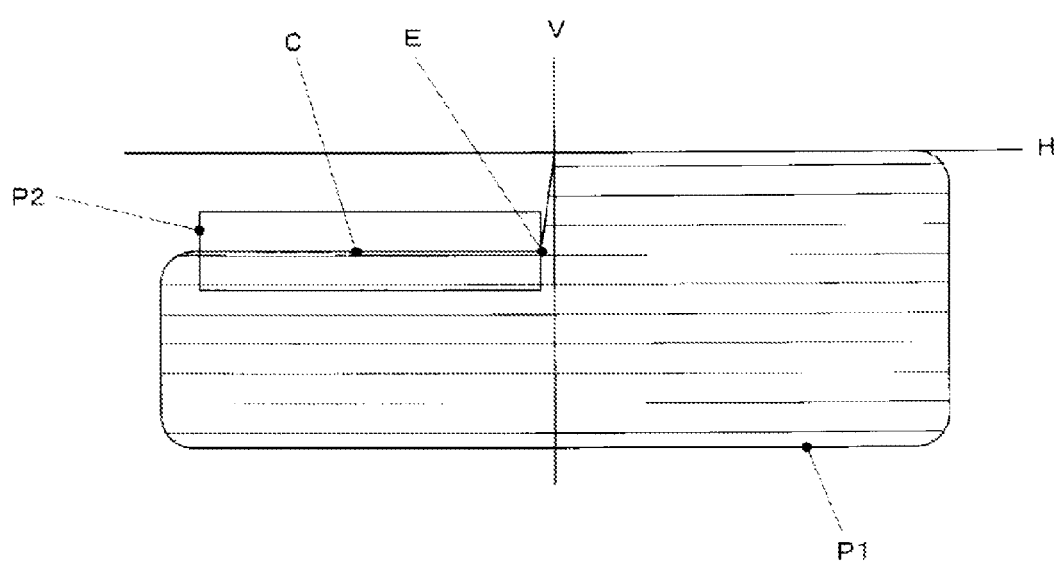
FIG. 5 is a view illustrating light distribution patterns of the vehicle headlight in the example.

FIG. 5 is a sectional view along line V-V in FIG. 1.

Headlights 1 are provided in a pair to the front end of the body with an interval in the width direction.

The headlight 1 includes a housing 10, an outer lens 20, a bezel extension 30, a first unit 100, a second unit 200 and the like.

The housing 10 is a case housing the respective units 100 and 200.

The housing 10 is formed in a box shape having an opening on the front side through injection molding with a resin material, for instance.

The housing 10 includes a back surface 11, an upper surface 12, a lower surface 13, side surfaces 14 and 15, and the like.

The back surface 11 is a surface on the rear side of the housing 10 and is formed in a flat shape extending approximately along the width direction and the vertical direction.

The shape of the back surface 11 when seen from the front is substantially a wide rectangle.

The upper surface 12, the lower surface 13, the side surfaces 14 and 15 have a flat shape and protrude to the front side respectively from the upper end, the lower end, and the side ends of the back surface 11.

The outer lens 20 closes the opening on the front side of the housing 10 and covers the front surface of the respective units 100 and 200.

The outer lens 20 is formed integrally of a transparent resin material.

The outer lens 20 includes a front surface 21, an upper surface 22, a lower surface 23, side surfaces 24 and 25, and the like.

The front surface 21 is a design surface exposed on the outside in a convex shape that protrudes to the front side with an inclination such that the upper end is receded further toward the rear side than the lower end.

The upper surface 22, the lower surface 23, the side surfaces 24 and 25 have a flat shape and protrude to the rear side respectively from the upper end, the lower end, and the side ends of the front surface 21.

The rear edges of the upper surface 22, the lower surface 23, and the side surfaces 24 and 25 are inserted to an engagement groove formed at the front edge of the upper surface 12, the lower surface 13, and the side surfaces 14 and 15 of the housing 10.

The bezel extension 30 is a design component on the inside (rear side) of the outer lens 20 and is provided with an opening in which lenses for respective units 100 and 200 or the like are disposed.

The first unit 100 is an illuminator (projector unit) that projects light emitted by an LED light source 110 to a predetermined region on the front side with a reflector 120 and a projection optical system 130.

The LED light source 110 is, for instance, a white LED and includes a heat sink 111, an optical-axis adjustment actuator 112, and the like.

The heat sink 111 releases heat generated by the LED light source 110 from a radiation fin protruding to the rear side and also acts as a base on which the LED light source 110 is installed.

As shown in FIG. 2, a part of the heat sink 111 extends to the rear of the second unit 200.

The LED light source 110 is placed on the upper surface of the heat sink 111.

The upper end of the heat sink 111 is swingably attached to the back surface 11 of the housing 10.

The lower end of the heat sink 111 is attached to the back surface 11 through the optical-axis adjustment actuator 112.

The optical-axis adjustment actuator 112 tilts the optical axis of the first unit 100 in the vertical direction by causing displacement of the lower end of the heat sink 111 in the front-back direction.

The reflector 120 is a parabolic reflector that covers from above the LED light source 110 installed on the upper surface of the heat sink 111.

With the reflector 120, light from the LED light source 110 is collected and reflected to the front side into the projection optical system 130.

The projection optical system 130 is provided with a shade having a shape corresponding to a cutoff line. By projecting an enlarged image of the shade to the front side, a cutoff line in a light distribution pattern P1 (see FIG. 5) is formed.

As shown in FIG. 1, the shape of the projection optical system 130 when seen from the front is substantially a circle.

The second unit 200 is an illuminator (reflector unit) that radiates light emitted by an LED light source 210 to a predetermined region ahead of the vehicle with a reflector 220.

The second unit 200 is disposed beside the first unit 100 to be on the inside in the width direction.

The LED light source 210 is, for instance, a white LED and includes a heat sink 211.

The heat sink 211 releases heat generated by the LED light source 210 from a radiation fin and also acts as a base on which the LED light source 210 is installed.

The LED light source 210 is placed on the upper surface of the heat sink 211.

The reflector 220 is a parabolic reflector that covers from above the LED light source 210 installed on the upper surface of the heat sink 211.

The reflector 220 reflects light from the LED light source 210 and projects light to the front via an inner lens 230 in a predetermined light distribution pattern P2 (see FIG. 5).

The inner lens 230 is disposed within an opening of the bezel extension 30 on the front side of the reflector 220.

The inner lens 230 is formed substantially of a flat transparent plate.

As shown in FIG. 1, the shape of the inner lens 230 when seen from the front is substantially a rectangle with a cutout along an arc concentric with the first unit 100 in a portion beside the first unit 100.

Next, the light distribution pattern formed by the headlight 1 will be described.

FIG. 5 is a view illustrating the light distribution patterns of the headlight 1. The V-axis and the H-axis respectively represent a vertical line and a horizontal line.

FIG. 5 illustrates a state of a passing beam (low beam) where light is projected on a flat surface disposed along the vertical direction and the width direction to face the vehicle from the front side.

FIG. 5 illustrates a case of right-hand traffic as one example and is mirror-reversed in the case of left-hand traffic.

The first unit 100 and the second unit 200 respectively form the light distribution patterns P1 and P2.

The light distribution pattern P1 is formed substantially in a rectangular shape having alongside along the width direction and includes a cutoff line C at the upper end.

The light distribution pattern P1 is intended to ensure long-distance visibility along the center on a driving lane of the vehicle, and is a main light distribution pattern that meets the standards for light distribution based on regulations in, for instance, Japan, Europe, China, and the US.

In the middle (along the traveling direction of the vehicle) of a cutoff line C in the left-right direction, an elbow point E at which there is an upward fold from the horizontal is provided.

On the oncoming lane side (right side in the case of left-hand traffic and left side in the case of right-hand traffic) of the elbow point E, the cutoff line C is along the horizontal direction and in a position lower than a horizontal plane passing through the center of the headlight 1, so that light above the cutoff line C is substantially blocked.

On the non-oncoming lane side (left side in the case of left-hand traffic and right side in the case of right-hand traffic) of the elbow point E, the upper end of the light distribution pattern P1 is in a step shape and higher than on the oncoming lane side. In a region adjacent to the elbow point E, the cutoff line is inclined such that the non-oncoming lane side is higher.

In a region on the non-oncoming lane side of the elbow point E, the upper end of the light distribution pattern P1 is substantially at the same height of the horizontal plane passing through the center of the headlight 1.

The light distribution pattern P2 is formed substantially as a wide rectangle.

The light distribution pattern P2 substantially overlaps with a region on the oncoming lane side (side on which the cutoff line C is low) of the elbow point E of the cutoff line C of the light distribution pattern P1.

The end of the light distribution pattern P2 on the elbow point E side substantially overlaps with the elbow point E.

The end of the light distribution pattern P2 on the opposite side of the elbow point E is offset slightly to the elbow point E side relative to the side end of the light distribution pattern P1.

The upper end and the lower end of the light distribution pattern P2 extend in the horizontal direction to be approximately parallel on the upper side and the lower side of the cutoff line C that overlaps with the light distribution pattern P2.

Next, a control system of the headlight 1 and the operation thereof will be described.

Figure 6:
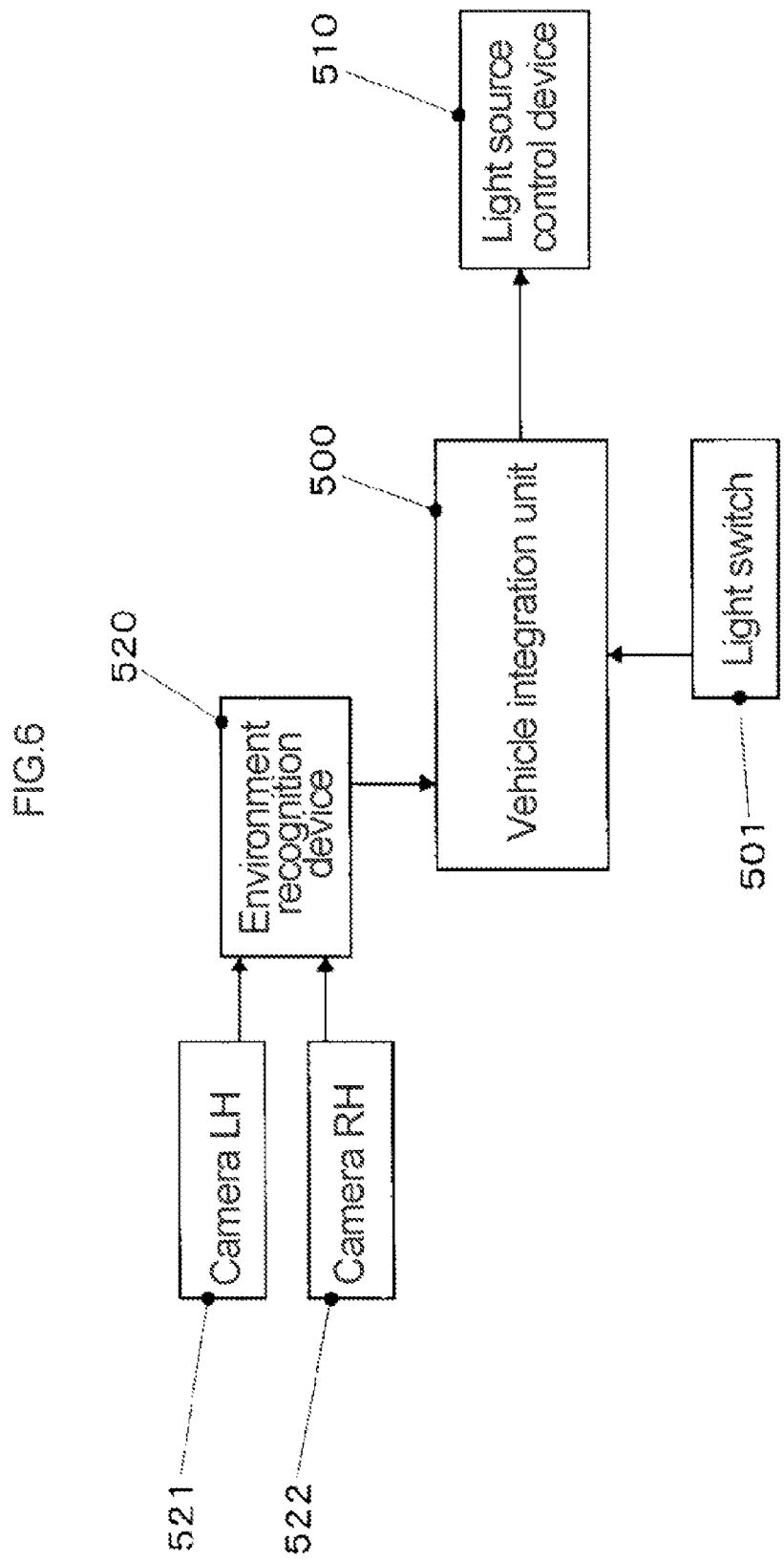
FIG. 6 is a block diagram illustrating the configuration of a control system of the vehicle headlight in the example.

FIG. 6 is a block diagram illustrating the configuration of the control system of the headlight.

The control system of the headlight 1 includes a vehicle integration unit 500, a light source control device 510, an environment recognition device 520, and the like.

These are capable of communication via an in-vehicle LAN such as, for instance, a CAN communication system.

The vehicle integration unit 500 is for overall control of various electrical components such as lights provided to the vehicle.

The vehicle integration unit 500 gives a control signal with respect to the light source control device 510 to separately control the first unit 100 and the second unit 200 to be on or off.

The vehicle integration unit 500 is connected with a light switch 501.

The light switch 501 is an operation unit with which a driver switches the headlight 1 on or off and switches between high beam (driving beam) and low beam (passing beam) when the headlight 1 is on.

The light source control device 510 includes a controller or the like that controls relay for performing power supply or shutoff with respect to the LED light source 110 of the respective units 100 and 200 of the headlight 1 and the bulb 210, and the lighting state of each light source.

The environment recognition device 520 detects the shape of a lane ahead of the vehicle or the type, position, or the like of an obstacle using a known stereo image processing technique with a stereo camera formed of a camera LH 521 and a camera RH 522.

The camera LH 521 and the camera RH 522 are imaging units disposed, for instance, at the upper end of a windshield (near a rear-view mirror) of the vehicle with an interval in the left-right direction.

The environment recognition device 520 recognizes an obstacle or the like based on an image taken by the camera LH 521 and the camera RH 522 and performs stereo image processing in which disparity between the respective cameras is used to calculate the distance from the vehicle with the principle of triangulation.

Through time-series imaging in the forward direction of the vehicle at predetermined intervals, the camera LH 521 and the camera RH 522 output a pair of images as a stereo image as needed.

The environment recognition device 520 performs stereo image processing for each stereo image and generates a distance image.

The distance image is defined as a set of distance values (disparities) associated with a position in an image plane. The amount of difference in the horizontal direction between correlating pixel blocks in the left and right images is the disparity.

Based on the disparity, the environment recognition device 520 calculates the distance of an object of in pixel block from the vehicle.

The environment recognition device 520 detects a group of adjacent pixels having substantially equal distance values as an object and determines the type of the object, such as an oncoming vehicle or preceding vehicle, based on the size in the height direction and width direction or the contour shape.

With the environment recognition device 520, it is possible to detect a headlight of an oncoming vehicle based on a high-luminance pixel group that is substantially white and detect a taillight of a preceding vehicle based on a high-luminance pixel group that is substantially red.

In this manner, the environment recognition device 520 is capable of detecting the relative position of an oncoming vehicle or preceding vehicle within an imaging range of the camera LH 521 and the camera RH 522 with respect to the vehicle.

Figure 7:
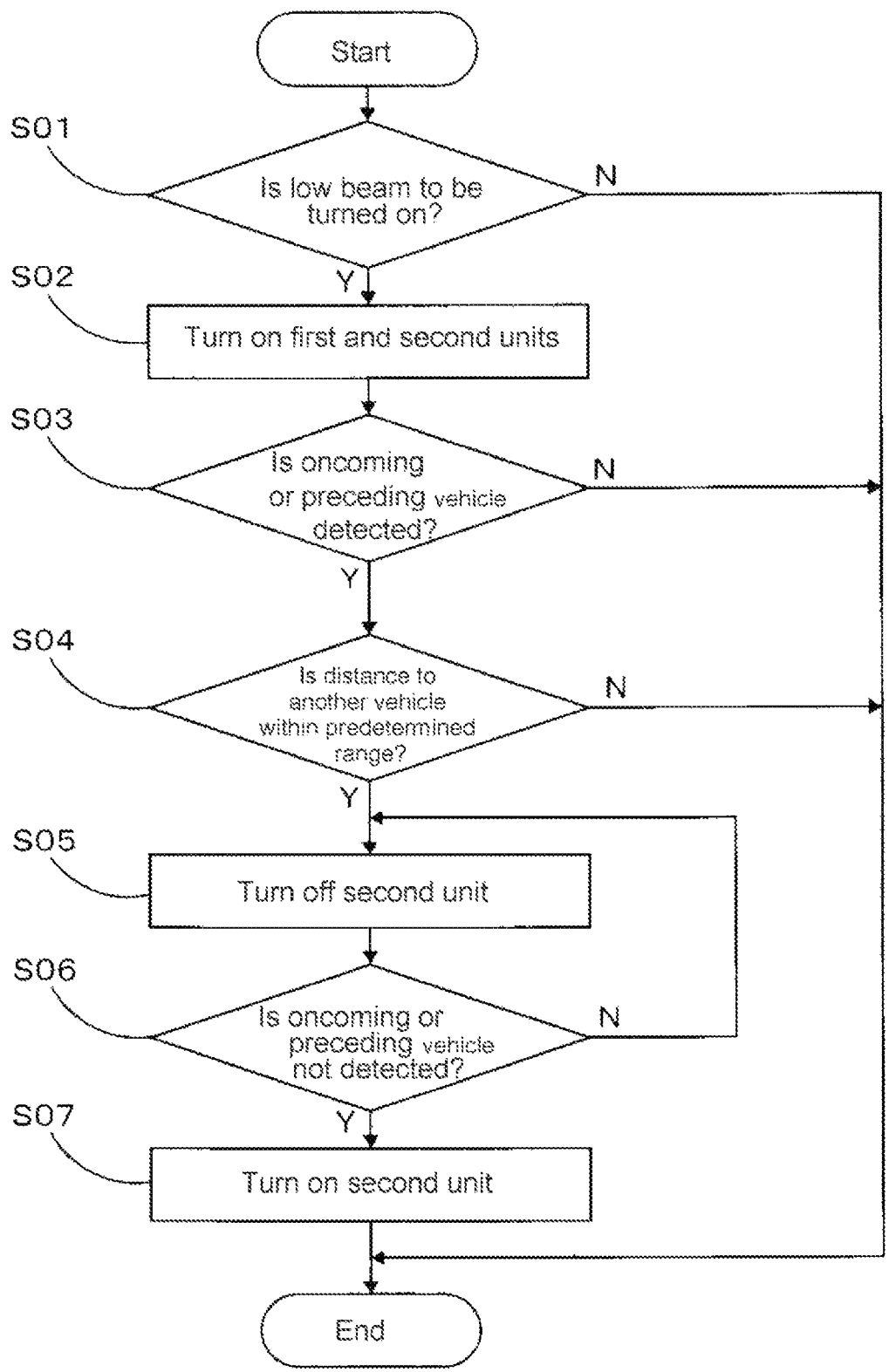
FIG. 7 is a flowchart illustrating the operation of the control system of the vehicle headlight in the example.

FIG. 7 is a flowchart showing the operation of the control system described above.

Each step will be described below in order.

<Step S01: Determining Whether to Turn on Low Beam>

The vehicle integration unit 500 determines whether or not an operation of selecting low beam to be turned on is performed with the light switch 501. In the case where low beam is selected to be turned on, step S02 is performed.

Otherwise, the process is terminated (returned).

<Step S02: Turning on First and Second Units>

The vehicle integration unit 500 gives a control signal to the light source control device 510 to bring the first unit 100 and the second unit 200 to an on-state.

Then, step S03 is performed.

<Step S03: Determining Whether Oncoming Vehicle or Preceding Vehicle is Detected>

The vehicle integration unit 500 determines whether or not the environment recognition device 520 has detected an oncoming vehicle or preceding vehicle within an illuminating region of the second unit 200 ahead of the vehicle, and proceeds to step S04 in the case where an oncoming vehicle or preceding vehicle has been detected.

In the case where an oncoming vehicle or preceding vehicle is not detected, the process is terminated (returned).

<Step S04: Determining Distance to Another Vehicle>

The vehicle integration unit 500 determines whether or not the distance of the oncoming vehicle or preceding vehicle detected by the environment recognition device 520 from the vehicle is less than or equal to a threshold set in advance.

Different thresholds are set respectively for an oncoming vehicle and a preceding vehicle.

For instance, in the case of an oncoming vehicle, a greater threshold (distance) is set than for a preceding vehicle, since a driver is looking in the direction of the vehicle and more likely to be dazzled.

In the case where the distance to the oncoming vehicle or preceding vehicle is less than or equal to the threshold, the vehicle integration unit 500 proceeds to step S05.

In the case where the distance exceeds the threshold, the process is terminated (returned).

<Step S05: Turning Off Second Unit>

The vehicle integration unit 500 gives a control signal to the light source control device 510 to bring the second unit 200 to an off-state.

Then, step S06 is performed.

<Step S06: Determining Whether Another Vehicle is not Detected>

The vehicle integration unit 500 determines whether or not the environment recognition device 520 has detected an oncoming vehicle or preceding vehicle within an illuminating region of the second unit 200 ahead of the vehicle, and proceeds to step S07 in the case where an oncoming vehicle or preceding vehicle is not detected.

In the case where an oncoming vehicle or preceding vehicle has been detected, processing of step S05 and thereafter is repeated.

<Step S07: Turning on Third Unit>

The vehicle integration unit 500 gives a control signal to the light source control device 510, turns on the second unit 200, and terminates the process.

With the example described above, the following effects can be obtained.

(1) By the cutoff line C of the light distribution pattern P1 of the first unit 100 being illuminated only in a region on the oncoming lane side of the elbow point E and not illuminated in a region on the non-oncoming lane side (vehicle side) with the light distribution pattern P2 of the second unit 200, non-uniformity in the light distribution on a road surface due to light being distributed additionally to a region in which a uniform illumination area is formed by the first unit 100 can be prevented.

(2) With a diffused light distribution generated by the second unit 200 that is a reflector unit, the contrast above and below the clear cutoff line C formed by the first unit 100 that is a projector unit can be reduced (obscured) to prevent a driver from feeling a sense of incongruity under normal conditions.

By stopping the illumination by the second unit 200 in the case where an oncoming vehicle or preceding vehicle has been detected, illumination above the cutoff line C that may cause glare can be reduced to prevent a driver of other vehicles from being dazzled.

(3) By detecting an oncoming vehicle or preceding vehicle based on a high-luminance pixel group detected from an image taken by a stereo camera, the oncoming vehicle or preceding vehicle can be appropriately determined to ensure the effects described above.

(Modified Example)

The present invention is not limited to the example described above. Various modifications and changes are possible and within the technical scope of the present invention.

(1) The shape, structure, material, manufacturing method, and the like of each component forming the headlight are not limited to the configuration of the example described above, and may be changed appropriately.

(2) The headlight in the example is formed of the first unit and the second unit. However, other units may be added.

(3) In the example, the light distribution pattern of the second unit is provided only in a region adjacent to a part of the cutoff line of the first unit. However, the light distribution pattern of the second unit may include other regions.

For instance, the light distribution pattern of the second unit may include a region corresponding to a shoulder ahead of the vehicle for early detection of a pedestrian.

Also, the light distribution pattern of the second unit may illuminate the left and right sides near the vehicle. Accordingly, a sudden interference by a pedestrian or the like can be appropriately monitored.

The invention claimed is:

1. A vehicle headlight comprising:
    a first illuminator including a projector unit that has a projection optical system and illuminates a predetermined region ahead of a vehicle with a first light distribution pattern having a cutoff line at an upper end; and
    a second illuminator including a reflector unit that has a reflective optical system for illumination with a second light distribution pattern that:
        substantially overlaps with the cutoff line in a region on an oncoming lane side of an elbow point of the cutoff line of the first light distribution pattern, and
        substantially does not include a region on a non-oncoming lane side of the elbow point.

2. The vehicle headlight according to claim 1, further comprising:
an other-vehicle detector that detects another vehicle driving ahead of the vehicle; and
an illumination controller that stops the illumination by the second illuminator in a case where the other vehicle has been detected.

3. A vehicle headlight comprising:
a first illuminator including a projector that has a projection optical system and illuminates a predetermined region ahead of a vehicle with a first light distribution pattern having a cutoff line at an upper end;
a second illuminator including a reflector unit that has a reflective optical system for illumination with a second light distribution pattern including the cutoff line of the first light distribution pattern wherein the second light distribution pattern:
substantially overlaps with the cutoff line in a region on an oncoming lane side of an elbow point of the cutoff line of the first light distribution pattern, and
substantially does not include a region on a non-oncoming lane side of an elbow point of the cutoff line of the first light distribution pattern;
an other-vehicle detector that detects another vehicle driving ahead of the vehicle; and
an illumination controller that stops the illumination by the second illuminator in a case where the another vehicle has been detected.

4. The vehicle headlight according to claim 2, wherein the other vehicle detector includes an imaging unit that captures an image ahead of the vehicle to detect a high-luminance portion corresponding to a headlight or taillight of another vehicle from an image captured by the imaging unit.

5. The vehicle headlight according to claim 3, wherein the other vehicle detector includes an imaging unit that captures an image ahead of the vehicle to detect a high-luminance portion corresponding to a headlight or taillight of another vehicle from an image captured by the imaging unit.

* * * * *